United States Patent [19]

McCulla et al.

[11] 4,418,989
[45] Dec. 6, 1983

[54] APPARATUS FOR SHIFTING THE WAVELENGTH OF LIGHT

[75] Inventors: William H. McCulla, Oak Ridge; John D. Allen, Jr., Knoxville, both of Tenn.

[73] Assignee: The United States of America as represented by the U.S. Department of Energy, Washington, D.C.

[21] Appl. No.: 343,802

[22] Filed: Jan. 29, 1982

[51] Int. Cl.³ .......................... G02B 5/12; G02B 7/18; G02B 27/00
[52] U.S. Cl. ..................................... 350/486; 350/99; 350/299; 350/289
[58] Field of Search ................ 350/486, 299, 289, 6.5, 350/99; 250/284, 423 P, 493.1; 343/18 B, 18 C, 18 D

[56] References Cited

U.S. PATENT DOCUMENTS 4,264,141  4/1981  Guers et al. .......................... 350/486
4,370,654  1/1983  Krutsch ................................ 350/99

OTHER PUBLICATIONS

M. Garbuny et al., "Method of Generation of Very Fast Light Pulses", *Rev. Sci. Inst.*, vol. 28, No. 10, (1957), pp. 826–827.

*Primary Examiner*—Jon W. Henry
*Attorney, Agent, or Firm*—Edwin D. Grant; Stephen D. Hamel; Richard G. Besha

[57] ABSTRACT

A light beam is reflected back and forth between a rotating body having a retroreflection corner at opposite ends thereof and a fixed mirror to change the wavelength of the light beam by the Doppler effect.

8 Claims, 2 Drawing Figures

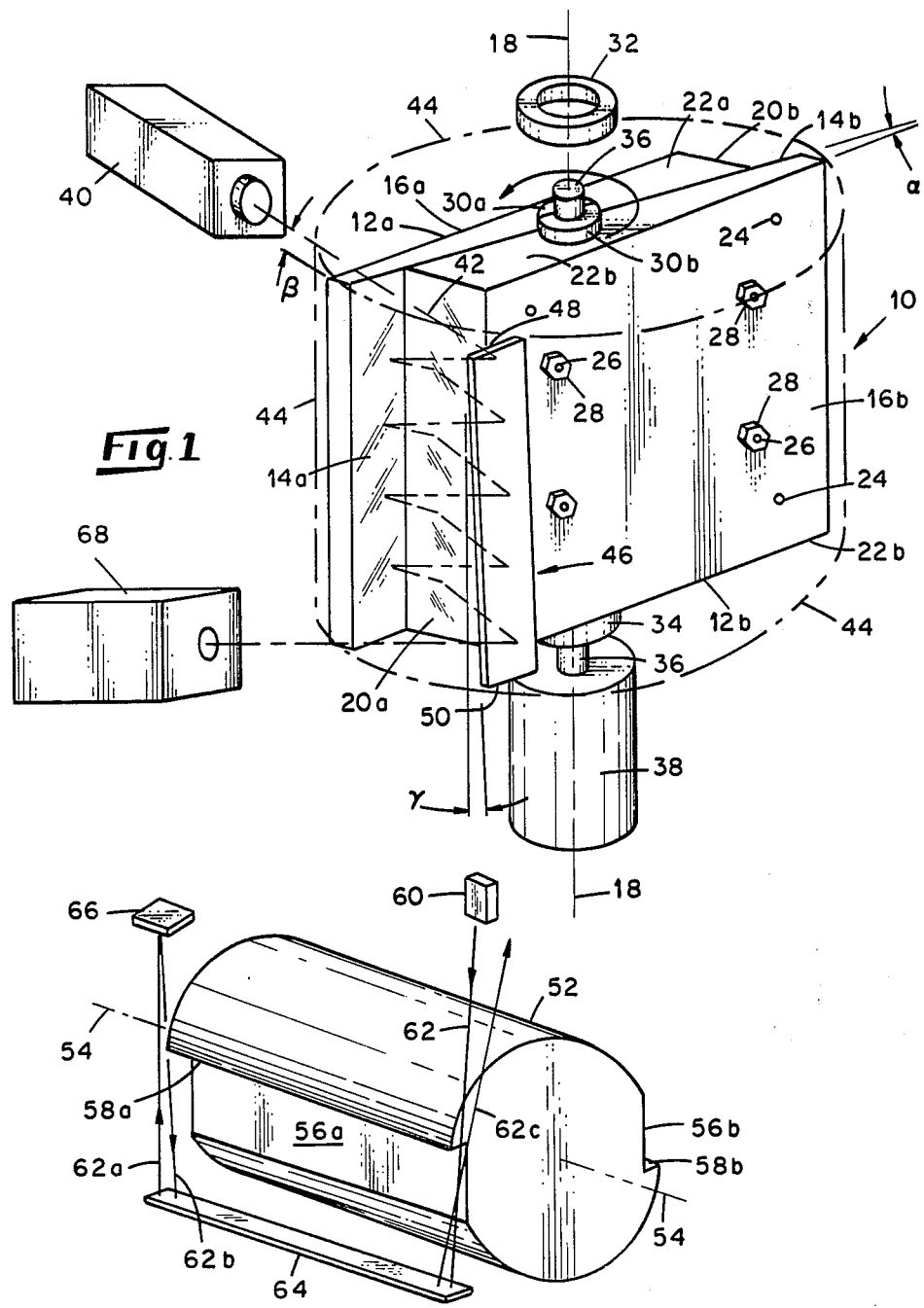

4,418,989

APPARATUS FOR SHIFTING THE WAVELENGTH OF LIGHT

BACKGROUND OF THE INVENTION

This invention, which resulted from a contract with the United States Department of Energy, relates to a means for shifting the wavelength of light and, more particularly, to a means for changing the wavelength of a laser beam so that the beam can be effectively used in a process for separating uranium isotopes.

As disclosed in U.S. Pat. No. 3,940,615, $U^{235}$ can be separated from $U^{238}$ by selectively ionizing the $U^{235}$ isotope in a vapor containing both $U^{235}$ and $U^{238}$, this ionization being effected by passing a laser beam having a proper frequency (or wavelength) through the vapor. Doppler shifting of the wavelength of a laser beam to obtain an optimal light wavelength for ionizing $U^{235}$ in such a separation process has been proposed heretofore. However, the applicant's are aware of no apparatus for Doppler shifting of the wavelength of light that has the features or advantages of apparatus constructed in accordance with the principles of their invention disclosed herein.

SUMMARY OF THE INVENTION

It is an object of this invention to provide an effective means for shifting the wavelength of light.

Another object of the invention is to provide an apparatus capable of tuning the frequency of a laser beam so that the beam can be effectively used in ionizing $U^{235}$ in a process for separating that isotope from $U^{238}$.

These objects are attained by preferred embodiments of the invention each including a first reflector mounted for rotation about an axis and comprising at least one retroreflection corner having two planar reflecting surfaces disposed substantially perpendicular to each other and extending longitudinally of said axis in spaced relation therewith, means for rotating said first reflector about said axis, means for projecting a light beam along a path generally tangent to the cylinder of revolution generated by said first reflector as it rotates, and a second reflector positioned outside said cylinder of revolution and having a planar reflecting surface oriented relative to said light projecting means and said first reflector so that said light beam is repetitively reflected back and forth between the reflecting surfaces of the first and second reflectors during a portion of each rotation of said first reflector, said light beam advancing along said reflecting surfaces longitudinally of said axis as it is reflected therebetween.

DESCRIPTION OF THE DRAWINGS

FIG. 1 is a schematic representation of a preferred embodiment of the invention.

FIG. 2 is a schematic representation of another embodiment of the invention.

DETAILED DESCRIPTION OF PREFERRED EMBODIMENTS OF THE INVENTION

In FIG. 1, reference number 10 generally designates a first reflector comprising two identical wedge-shaped plates 12a,12b which abut along planar sides 14a,14b, thereof. The other sides 16a,16b of the plates are planar and parallel to each other, and the abutting sides 14a,14b are disposed at an angle α relative to sides 16a,16b. The thin end of one plate is juxtaposed to the thick end of the other plate, and the plates are offset from each other in a direction radial of the vertical axis 18 located centrally of the first reflector. Thus portions of side surfaces 14a,14b project from the planar end surfaces 20a,20b of the plates, which end surfaces are disposed perpendicular to surfaces 14a,14b respectively. The side edge surfaces 22a,22b of the plates are also perpendicular to axis 18. Plates 12a,12b are held in fixed relation by locating pins 24 and bolts 26 respectively fitted in holes extending through the plates, nuts 28 being engaged with the bolts.

Respectively formed on the upper side edge of plates 12a,12b are two semicircular members 30a,30b which cooperate to form a ring when the plates are held together as illustrated. Two semicircular members (not illustrated) corresponding to members 30a,30b are also respectively formed on the lower side edge surfaces of the plates, and two rings 32,34 are respectively pressed around the two pairs of semicylindrical members to assist in holding plates 12a,12b in alignment, these rings being centered on axis 18 and ring 32 being illustrated away from its restraining position around members 30a,30b so that the latter can be seen. Semicylindrical grooves (not illustrated) are aligned with the aforesaid semicircular members and respectively extend across side surfaces 14a,14b, and the drive shaft 36 of a motor 38 is positioned in these grooves and in the rings formed by the abutting semicircular members.

A laser 40 is positioned relative to first reflector 10 so that a light beam 42 projected therefrom travels on a path disposed in a vertical plane that is substantially tangent to the cylinder of revolution 44 generated by plates 12a,12b when they are rotated by motor 38. The path of beam 42 is disposed at a small angle β relative to a horizontal plane so that it passes over the upper side edge surfaces of the first reflector and impinges on a second reflector which is generally designated by reference number 46 and which has upper and lower edges 48,50 respectively substantially coplanar with the upper and lower side edges of the first reflector. The surface of second reflector 46 on which beam 42 impinges is planar and disposed at a small angle γ relative to a vertical plane which includes axis 18.

A second embodiment of the invention illustrated in FIG. 2 comprises a cylinder 52 which is rotated about its horizontally extending longitudinal axis 54 by any suitable means. Two grooves extend longitudinally of the cylinder at diametrically opposed points on its periphery, each groove having a first planar surface 56a,56b disposed parallel to axis 54 and a second planar surface 58a,58b disposed perpendicular to said first surface. A laser 60 located adjacent one end of cylinder 52 projects a light beam 62 onto the planar reflecting surface of a mirror 64 which extends lengthwise of the cylinder is spaced, parallel relation therewith. Another mirror 66 also provided with a planar reflecting surface is positioned adjacent the other end of cylinder 52.

OPERATION OF THE PREFERRED EMBODIMENTS OF THE INVENTION

The arrow located adjacent the upper end of shaft 36 in FIG. 1 indicates the direction of rotation of first reflector 10 when the first described embodiment of the invention is in use. The angles α, β, and γ defined hereinbefore are selected so that when the exposed portion of side 14a of plate 12a confronts second reflector 46 during the rotation of the first reflector 10, light beam 42 emitted from laser 40 is reflected from the second reflector to said side surface 14a, thence to end surface 20a of plate 12b, and back to the second reflector at a point thereon located below the initial point of impingement of the light beam on the second reflector. The light beam then makes multiple passes between the first and second reflectors in the same way and advances along the reflecting surfaces thereof in a direction extending longitudinally of axis 18 it is reflected on a path passing below the lower edge of either the first reflector 10 or the second reflector 46. Only a few passes of the light beam 42 between the first and second reflectors are illustrated in FIG. 1, but the orientation of second reflector 46 relative to laser 40 and first reflector 10 is actually selected so that the beam will make many passes between the two reflectors. First reflector 10 is rotated at a high angular velocity, and each time light beam 42 impinges upon the moving plate 12a the wavelength of the light is changed by the Doppler effect. When first reflector 10 has rotated 180° from its position illustrated in FIG. 1, laser 40 emits another pulse of light and the wavelength of this light is likewise changed by impingement of the light on side surface 14b of plate 12b.

Several types of laser produce light having a wavelength close to that most suitable for exciting $U^{235}$ so that it can be separated from $U^{238}$ in accordance with known procedures. The large numbe of reflections of a light beam which can be obtained by use of the disclosed apparatus using rotating retroreflection corners makes it possible to change the wavelength of light produced by such available lasers to the optimal wavelength required for exciting $U^{235}$ in a uranium isotope separation process. The use of the disclosed invention for exciting $U^{235}$ so that it can be separated from $U^{238}$ is illustrated in FIG. 1, wherein light beam 42 is directed into a chamber 68 containing both of these uranium isotopes. A particular advantage of the arrangement of the FIG. 1 embodiment of the invention is that a highly polished finish can be provided on side surfaces 14a,14b and end surfaces 20a,20b of plates 12a,12b before they are secured to each other. It is also easy to balance plates 12a,12b and the connectors associated therewith so that first reflector 10 can be rotated at high angular velocity without vibrating.

In the operation of the embodiment of the invention illustrated in FIG. 2, light beam 62 is reflected between mirror 64 and surfaces 56a,56b, 58a,58b of rotating cylinder 52 in the same manner described for the travel path of beam 42 of the FIG. 1 embodiment. For simplicity, however, in FIG. 2 the multiple passes of beam 62 from mirror 64 to the two reflecting surfaces of each groove in cylinder 52 are not illustrated. After beam 62 travels to the end of mirror 64 tha is on the left in the drawing, it is projected along path 62a and impinges upon mirror 66, which reflects the beam back to mirror 64 long path 62b. The beam then travels back and forth between mirror 64 and cylinder 52 while advancing toward the end of said mirror on the right in the drawing, and it finally travels along path 62c which passes away from the cylinder. The double traversal of beam 62 along the length of the reflecting surfaces on cylinder 52 obviously makes it possible to obtain a greater shift of the wavelength of a light beam than would be obtained by a single pass along the cylinder. It will also be obvious that other arrangements for shifting the wavelength of light can be devised without departing from the principles of the invention.

The shift in light wavelength obtainable by means of the disclosed apparatus can be calculated by means of the following equation:

$$f_f = f_o[1 \pm 2n(v/c)]$$

wherein $f_f$ = final wave number (wavelength $-^1$) of light beam reflected back and forth between rotating and fixed mirrors; $f_o$ = original light wave number; n = number of reflections of light from rotating mirror; v = velocity of mirror (m/sec); and c = velocity of light (m/sec).

If reflector 10 of FIG. 1 is rotated so that reflecting surfaces 14a, 14b move toward reflector 46, the frequency of light from laser 40 is increased. Rotation of reflector 10 in the opposite direction decreases the frequency of beam 42. In one embodiment of the invention that has been tested, the construction of reflector 10 was such that the distance between axis 18 and the point of impingement of beam 42 on surfaces 14a,14b was about 14 cm. Reflector 10 was rotated at 50,000 rpm, and light having an initial wave number of 628 cm$^{-1}$ was reflected 31 times from each surface 14a,14b of the reflector. Hence the velocity of the reflecting surfaces was 733 m sec$^{-1}$, and a wave number shift of 0.095 cm$^{-1}$ was obtained.

What is claimed is:

1. Apparatus for shifting the wavelength of light, comprising:
    a first reflector mounted for rotation about an axis and comprising at least one retroreflection corner having two planar reflecting surfaces disposed substantially perpendicular to each other and extending longitudinally of said axis in spaced relation therewith;
    means for rotating said first reflector about said axis;
    means for projecting a light beam along a path generally tangent to the cylinder of revolution generated by said first reflector as it rotates; and
    a second reflector positioned outside said cylinder of revolution and having a planar reflecting surface oriented relative to said projecting means and said first reflector so that said light beam is repetitively reflected back and forth between said reflecting surface of said second reflector and said reflecting surfaces of said first reflector during a portion of each rotation of said first reflector, said light beam advancing along said reflecting surfaces longitudinally of said axis as it is reflected therebetween.

2. The apparatus of claim 1 wherein:
    one reflecting surface on said first reflector is substantially coincident with or parallel to said axis; and
    the reflecting surface on said second reflector is oblique to a plane including said axis.

3. The apparatus of claim 2 wherein said first reflector includes two retroreflection corners each having two reflecting surfaces as defined therein, said retroreflection corners being spaced equidistant from said axis on opposite sides thereof.

4. The apparatus of claim 3 wherein said first reflector comprises two identical wedge-shaped plates which abut on sides thereof, the thin end of one plate being juxtaposed to the thick end of the other plate and said plates being offset from each other radially of said axis to form said retroreflection corners at the ends thereof.

5. The apparatus of claim 3 wherein said light beam projecting means comprises a laser.

6. The apparatus of claim 3 wherein two light pulses are emitted from said light beam projecting means during each rotation of said first reflector means.

7. The apparatus of claim 1 wherein said second reflector is located adjacent one end of said cylinder of revolution and including a third reflector located adjacent the other end of said cylinder of revolution and oriented relative to said second reflector so as to reflect said light beam back to the latter after the light beam has traversed the reflecting surfaces thereof.

8. The apparatus of claim 1 including means for exposing $U^{235}$ to said light beam after it has traversed the reflecting surfaces of said first and second reflectors.

* * * * *